United States Patent
Corrado et al.

(10) Patent No.: US 7,266,711 B2
(45) Date of Patent: Sep. 4, 2007

(54) SYSTEM FOR STORING DATA WITHIN A RAID SYSTEM INDICATING A CHANGE IN CONFIGURATION DURING A SUSPEND MODE OF A DEVICE CONNECTED TO THE RAID SYSTEM

(75) Inventors: Francis R. Corrado, Newton, MA (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 10/716,046

(22) Filed: Nov. 17, 2003

(65) Prior Publication Data

US 2005/0108586 A1    May 19, 2005

(51) Int. Cl.
*G06F 1/26* (2006.01)
(52) U.S. Cl. .................. 713/320; 713/100; 713/300
(58) Field of Classification Search ............. 713/300, 713/320, 323, 324, 100
See application file for complete search history.

(56) References Cited

U.S. PATENT DOCUMENTS

| | | | | |
|---|---|---|---|---|
| 6,058,455 A | * | 5/2000 | Islam et al. ............. | 711/114 |
| 6,667,813 B2 | * | 12/2003 | Saruwatari et al. ....... | 358/1.15 |
| 6,681,334 B2 | * | 1/2004 | Nakamura ............... | 713/300 |
| 6,687,815 B1 | * | 2/2004 | Dwyer et al. ............ | 713/1 |
| 2003/0002492 A1 | * | 1/2003 | Gallagher et al. ........ | 370/360 |
| 2003/0055529 A1 | * | 3/2003 | Aosawa .................. | 700/220 |
| 2003/0097611 A1 | * | 5/2003 | Delaney et al. .......... | 714/13 |
| 2004/0181534 A1 | * | 9/2004 | Mortensen et al. ....... | 707/100 |
| 2004/0181560 A1 | * | 9/2004 | Romanufa et al. ........ | 707/202 |
| 2005/0036300 A1 | * | 2/2005 | Dowling et al. ......... | 362/101 |
| 2005/0060609 A1 | * | 3/2005 | El-Batal et al. ......... | 714/20 |
| 2006/0005085 A1 | * | 1/2006 | Zunino et al. ........... | 714/47 |

* cited by examiner

*Primary Examiner*—Chun Cao
*Assistant Examiner*—Malcolm D Cribbs
(74) *Attorney, Agent, or Firm*—Caroline M. Fleming

(57) ABSTRACT

In one embodiment, a method is provided that may include, if a change in configuration of storage occurs during one mode of operation of a device, storing, in the storage, data indicative, at least in part, of resulting configuration of the storage resulting after the change. The device may have a relatively lower power consumption rate while the device is operating in the one mode of operation compared to a relatively higher power consumption rate that the device may have while the device is operating in another mode of operation. Of course, many modifications, variations, and alternatives are possible without departing from this embodiment.

29 Claims, 2 Drawing Sheets

SYSTEM FOR STORING DATA WITHIN A RAID SYSTEM INDICATING A CHANGE IN CONFIGURATION DURING A SUSPEND MODE OF A DEVICE CONNECTED TO THE RAID SYSTEM

FIELD

This disclosure relates to configuration change indication.

BACKGROUND

In one conventional data storage system, a computer node is coupled to a redundant array of inexpensive disks (RAID), and includes a processor. The RAID stores RAID configuration data that specifies the storage devices and volumes comprised in the RAID. The processor executes operations that result in data being written into the RAID in accordance with the RAID configuration data stored in the RAID. When the node operates in a relatively low power consumption state, the node may consume power at a relatively lower rate compared to when the node is operating in a relatively higher power consumption state. While the node is operating in this relatively low power consumption state, operations whose execution result in data being written into the RAID are suspended, in order to reduce the amount of power consumed. After the node returns to operating in the relatively higher power consumption state, the execution of these operations may be resumed.

In this conventional system, if one or more of the storage devices and/or volumes are added to or removed from the RAID while the node is operating in the relatively low power consumption state, the RAID configuration data is not changed to reflect the storage device and/or volume addition or deletion. This may result in this RAID configuration data being inaccurate. After the node returns to operating in the relatively higher power consumption state, operations may be executed that result in data being written into the RAID in accordance with this inaccurate RAID configuration data. This may result in corruption of data stored in the RAID.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
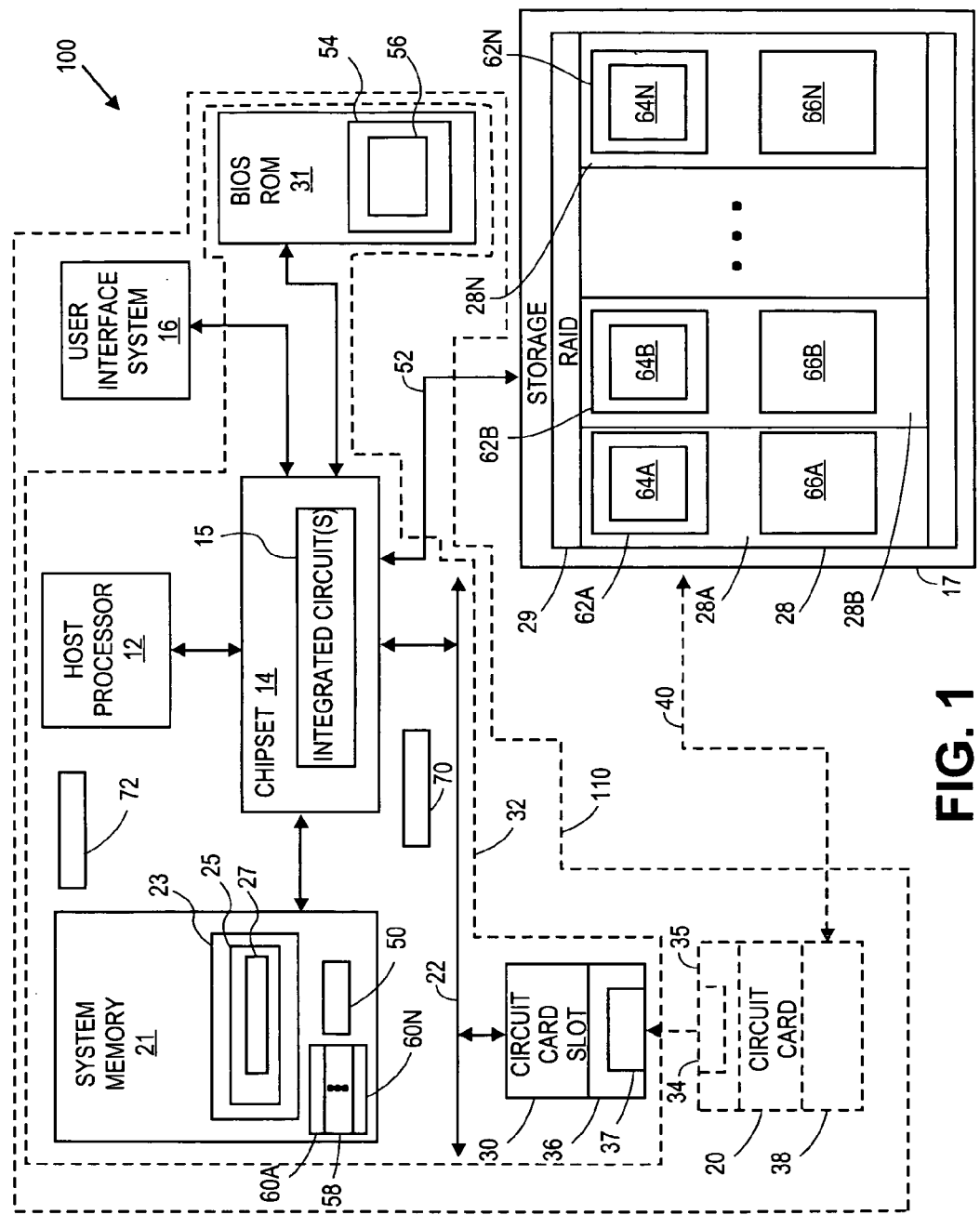
FIG. 1 is diagram that illustrates a system embodiment.

FIG. 1 illustrates a system embodiment 100. System 100 may include operative circuitry 110 that may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, system memory 21 and user interface system 16 to each other and to a bus system 22. Chipset 14 may also include an input/output (I/O) bridge/hub system (not shown) that may couple the host bridge/bus system to bus 22. Chipset 14 may comprise one or more integrated circuits 15. As used herein, "integrated circuit" means a semiconductor device and/or microelectronic device, such as, for example, a semiconductor integrated circuit chip. User interface system 16 may comprise, e.g., a keyboard, pointing device, and display system that may permit a human user to input commands to, and monitor the operation of, system 100.

System 100 also may comprise a basic input/output (I/O) system (BIOS) read only memory (ROM) 31 that may be coupled to one or more integrated circuits 15. BIOS ROM 31 may comprise machine-executable firmware BIOS program instructions 54. These instructions 54 may be executable by host processor 12.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, including, for example, other or later developed versions of the PCI Express™ or PCI-X buses, without departing from this embodiment.

System embodiment 100 may comprise storage 17. Storage 17 may comprise RAID 29. RAID 29 may comprise a plurality of storage devices 28. Storage devices 28 may comprise, for example, one or more respective mass storage devices 28A, 28B, . . . 28N. Storage 17 may be coupled to one or more integrated circuits 15 of chipset 14 via one or more communication media 52. As used herein, the terms "storage" and "storage device" may be used interchangeably to mean one or more apparatus into, and/or from which, data and/or commands may be stored and retrieved, respectively. Also, as used herein, the term "mass storage device" means one or more storage devices capable of non-volatile storage of data and/or commands, and, for example, in this embodiment, may include, without limitation, one or more magnetic, optical, and/or semiconductor storage devices. As used herein, a "communication medium" means a physical entity through which electromagnetic radiation may be transmitted and/or received. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

The RAID level that may be implemented by RAID 29 may be 0, 1, or greater than 1. Depending upon, for example, the RAID level implemented in RAID 29, the number of mass storage devices comprised in storage devices 28 and each of one or more mass storage devices 28A, 28B, . . . 28N may vary so as to permit the number of such mass storage devices to be at least sufficient to implement the RAID level implemented in RAID 29.

Processor 12, system memory 21, chipset 14, bus 22, BIOS ROM 31, and circuit card slot 30 may be comprised in operative circuitry 110. Processor 12, system memory 21, chipset 14, bus 22, BIOS ROM 31, and circuit card slot 30 also may be comprised in a single circuit board, such as, for example, a system motherboard 32. Operative circuitry 110 may comprise motherboard 32.

In this embodiment, one or more integrated circuits 15 may exchange data and/or commands with storage 17, via one or more media 52 in accordance with, e.g., Serial Advanced Technology Attachment (S-ATA) protocol. In accordance with this embodiment, if one or more integrated circuits 15 and storage 17 exchange data and/or commands in accordance with S-ATA protocol, the S-ATA protocol may comply or be compatible with the protocol described in "Serial ATA: High Speed Serialized AT Attachment," Revision 1.0, published on Aug. 29, 2001 by the Serial ATA Working Group (hereinafter, the "S-ATA Specification"), and/or other and/or later developed versions of the S-ATA Specification. Of course, alternatively, one or more integrated circuits 15 may exchange data and/or commands with storage 17 in accordance with other and/or additional communication protocols, without departing from this embodiment.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37.

Without departing from this embodiment, instead of being coupled to, and exchanging data and/or commands with one or more integrated circuits 15, storage 17 may be coupled to operative circuitry 38 of host bus adapter (HBA) circuit card 20 (shown in ghost in FIG. 1). If system 100 includes circuit card 20, card 20 may include a bus expansion interface 35 that may comprise a bus connector 34. In this alternate arrangement, connector 37 may be electrically and mechanically mated with bus connector 34.

Also in this alternate arrangement, slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, circuitry 38 may become electrically coupled to bus 22 and may exchange data and/or commands with system memory 21, host processor 12, and/or user interface system 16 via bus 22 and chipset 14.

System memory 21 each comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 21 may comprise other and/or later-developed types of computer-readable memory.

Machine-readable program instructions may be stored in memory 21 and BIOS ROM 31. These instructions may be accessed and executed by processor 12. When executed by processor 12, these instructions may result in processor 12 and/or circuitry 110 performing the operations described herein as being performed by processor 12 and/or circuitry 110.

During operation of circuitry 110, one or more program processes 23 may reside in memory 21 and be executed by processor 12. One or more processes 23 may comprise, for example, one or more operating system processes 25, such as, in this embodiment, one or more Microsoft® Windows® XP operating system processes spawned and/or generated by execution of Microsoft® Windows® XP operating system commercially available from Microsoft Corporation of Redmond, Wash. Of course, without departing from this embodiment, one or more processes 23 and/or 25 may comprise other types of processes, including, for example, other types of operating system processes. One or more processes 25 may comprise one or more kernel mode drivers 27. The execution of one or more processes 23, 25 and/or 27 may permit and/or facilitate, for example, a human user (not shown) to control and monitor, using system 16, operation of storage 17.

Mass storage devices 28A, 28B, . . . 28N may comprise one or more storage volumes 66A, 66B, . . . 66N. Of course, the number of storage volumes 66A, 66B, . . . 66N, storage devices 28, and mass storage devices 28A, 28B, . . . 28N stored in storage 17 may vary without departing from this embodiment. As used herein, a "storage volume" may comprise a physical storage volume and/or logical storage volume. Depending upon the particular implementation of system 100, each of the respective storage volumes 66A, 66B, . . . . 66N may span and/or be comprised in two or more respective mass storage devices in RAID 29 without departing from this embodiment.

Figure 2:
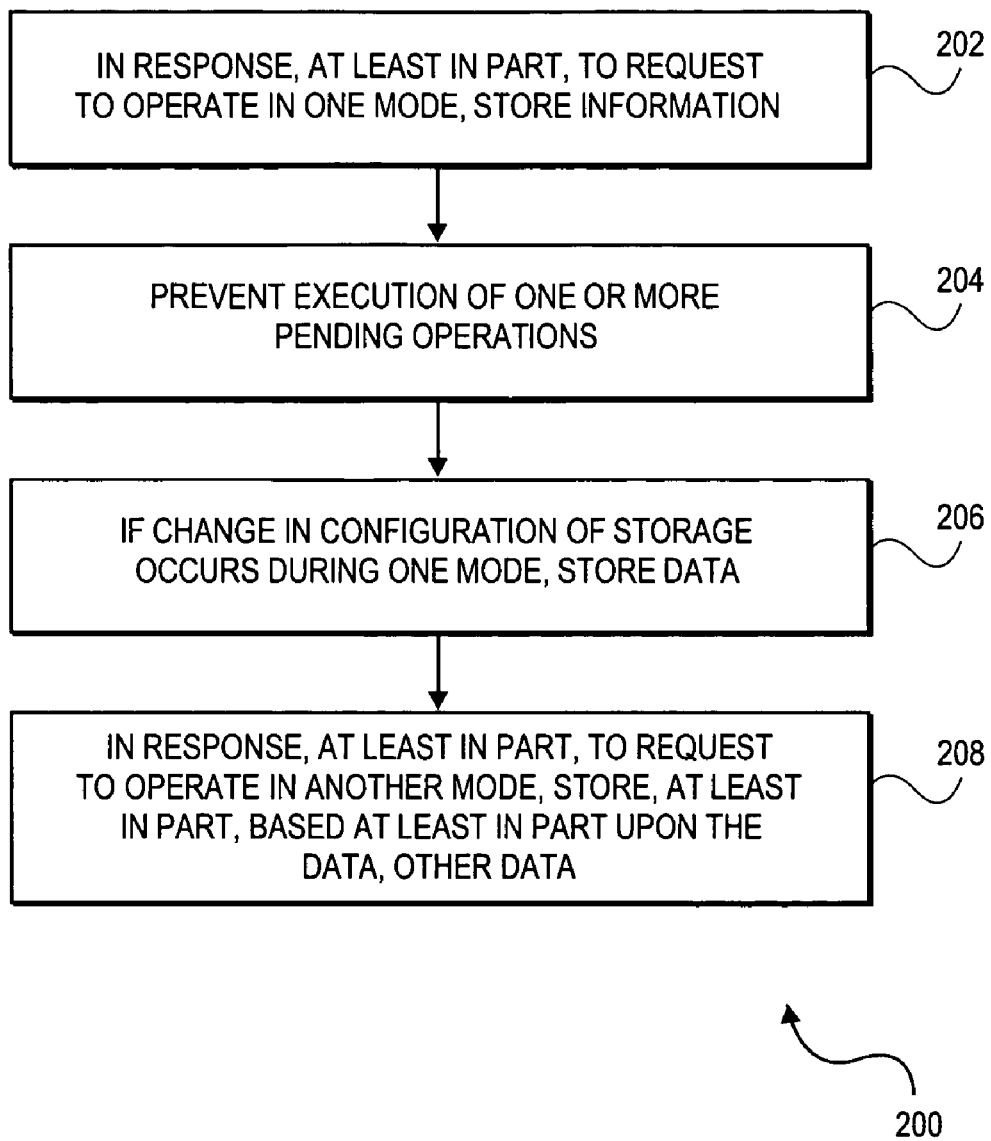
FIG. 2 is a flowchart that illustrates operations that may be performed according to an embodiment.

With reference now being made to FIG. 2, operations 200 that may be performed in system 100 in accordance with an embodiment will be described. In this embodiment, after, for example, a reset and/or restart of processor 12, system 100, and/or circuitry 110, the execution of one or more processes 23 and/or 25 by processor 12 may result in processor 12 determining, for example, that a predetermined period of time has elapsed since the last most recent time that a human user entered data and/or a command to circuitry 110 via user interface system 16. This may result in processor 12 generating and issuing to one or more components in circuitry 110 one or more requests 70 that circuitry 110 and/or these one or more components operate in one mode of operation. In this embodiment, these one or more components may comprise, for example, system 16, one or more processes 23, 25, and/or 27, memory 21, and/or circuitry comprised in host processor 12 and/or chipset 14. In this embodiment, this one mode of operation may comprise, for example, a sleep mode of operation. As used herein, the terms "sleep mode of operation," "suspend mode of operation," "hibernation mode of operation," and "hibernate mode of operation" may be used interchangeably to mean a mode of operation of a device in which the device may be capable of consuming actuating power, such as for example, in this embodiment, actuating electrical power, at a rate that is relatively lower than another rate at which the device may consume actuating power during another mode of operation, such as, for example, in this embodiment, a resume mode of operation. As used herein, the term "resume mode of operation" means a mode of operation of a device in which the device may consume actuating power, such as for example, in this embodiment, actuating electrical power, at a rate that is relatively higher than another rate at which the device may consume actuating power during another mode of operation, such as, for example, in this embodiment, a sleep mode of operation. As used herein, a "device" may, but is not required to comprise, at least in part, a physical, logical, and/or virtual device and/or process.

For example, in response, at least in part, to one or more requests 70, processor 12 and/or chipset 14 may signal memory 21. This may result in status information being stored in non-volatile memory comprised in memory 21 and/or in one or more mass storage devices comprised in storage devices 28, as illustrated by operation 202. In this embodiment, this status information may indicate, at least in part, status of one or more processes 23 being executed, at least in part, by a device, such as, for example, processor 12. In this embodiment, such "status" may comprise, for example, an indication of the one or more processes 23 currently residing in memory 21, and current state and/or value of one or more variables, execution of program instructions, and/or data structures comprised in, utilized by, and/or operated upon by one or more processes 23, although many variations are possible without departing from this embodiment.

Also for example, as illustrated by operation 204 in FIG. 2, in response, at least in part, to one or more requests 70, current state and/or value of one or more variables, execution of program instructions, and/or data structures comprised in, utilized by, and/or operated upon by one or more processes 27 may be altered, prior to or after execution of operation 202, such that execution of one or more processes 27 by processor 12 may result in any currently executing operations involving storage 17 being permitted to complete their execution, and also may result in one or more pending operations involving storage 17 whose execution is requested by one or more I/O requests generated subsequent to receipt by one or more drivers 27 of one or more requests 70, to be prevented from being executed, until after operation 208 (described below) has been executed. As used herein, a "pending" operation means an operation whose execution has yet to be commenced, at least in part.

For example, as a result of execution of one or more drivers 27, processor 12 may maintain in system memory 21 an I/O request queue 58 that may comprise a plurality of I/O requests 60A . . . 60N requesting execution of operations involving storage 17. For example, requests 60A and 60N each may request accessing of data stored in storage 17. In this embodiment, the accessing of data in storage 17 may comprise, for example, a writing of data into storage 17 and/or a reading of data stored in storage 17. During a resume mode of operation of circuitry 110, the execution of one or more drivers 27 by processor 12 may result in execution of one or more of the I/O requests in queue 58 that may result in accessing of data in storage 17.

As result of operation 204, if, for example, request 60A requests execution of an operation involving storage 17 that is currently being executed by storage 17 when one or more drivers 27 receives one or more requests 70, the execution of one or more drivers 27 by processor 12 may result in this operation involving storage 17 being permitted to complete its execution. Also as result of operation 204, if, for example, request 60N requests execution of a pending operation involving storage 17, the execution of one or more drivers 27 by processor 12 may prevent this pending operation from being executed by storage 17, until after operation 208 (described below) is executed.

After execution of operation 204, the execution of one or more drivers 27 by processor 12 may result in processor 12 storing in storage 17 one or more copies 62A, 62B, . . . 62N of storage configuration data. For example, in this embodiment, copies 62A, 62B, . . . 62N of storage configuration data may be stored in mass storage devices 28A, 28B, . . . 28N, and may comprise respective copies 64A, 64B . . . 64N of metadata. Each of these copies 64A, 64B, . . . 64N of metadata may identify, indicate, and/or specify, for example, mass storage devices 28A, 28B, . . . 28N and/or volumes 66A, 66B, . . . 66N presently comprised in storage devices 28 in RAID 29, physical and/or logical parameters (e.g., total size, available storage space, location, addresses, blocks, partitions, and files) of each such mass storage device and/or volume, current state of each such mass storage device and/or volume (e.g., whether each such mass storage device and/or volume currently has not failed, has failed at least in part, or is expected to fail within a predetermined period of time, and/or error checking information from which such state may be determined), and the respective serial numbers of each such mass storage device and/or volume.

Thereafter, also in response, at least in part, to one or more requests 70, circuitry 110 and/or components of circuitry 110 may enter a suspend mode of operation. For example, in this embodiment, in this suspend mode of operation, circuitry comprised in processor 12, chipset 14, memory 21, one or more integrated circuits 15, and/or user interface system 16 may be de-activated and/or otherwise may be placed in a state in which such circuitry may not consume electrical power or may consume electrical power at a relatively reduced rate of consumption compared to when such circuitry is operating in a resume mode of operation. This may result in circuitry 110 and/or these components of circuitry 110 consuming electrical power at a relatively lower rate than when such circuitry 110 and/or these components of circuitry 110 are operating in a resume mode of operation.

Thereafter, circuitry 110 and/or these components of circuitry 110 may operate in a suspend mode of operation. If, while circuitry 110 and/or these components of circuitry 110 are operating in a suspend mode of operation, a human user of system 100 physically removes one or more of the mass storage devices 28A, 28B, . . . 28N, this may result in a change in the configuration of storage 17. As used herein, "configuration" of storage means type, nature, arrangement, one or more components, one or more properties, and/or one or more characteristics of the storage and/or of one or more components of the storage. In this embodiment, examples of changes that may occur in the configuration of storage 17 may include one or more changes in storage devices 28 and/or volumes 66A, 66B, . . . 66N, such as, for example, one or more insertions and/or removals of one or more mass storage devices, and/or one or more additions and/or deletions of one or more storage volumes in storage 17. For example, in this embodiment, if the human user removes one or more mass storage devices 28N from storage 17, the change in the configuration of storage 17 that may result from this removal of one or more mass storage devices 28N from storage 17 may comprise, but not necessarily be limited to, elimination of one or more mass storage devices 28N and volume 66N from storage 17.

In this embodiment, if a change in the configuration of storage 17 occurs while circuitry 110 and/or one or more components of circuitry 110 are operating in a suspend mode of operation, data may be stored in storage 17 that may be indicative, at least in part, of a resulting configuration of storage 17 that may result after the configuration change to storage 17 has occurred, as illustrated by operation 206 in FIG. 2. For example, in this embodiment, if mass storage device 28N is removed from storage 17 while circuitry 110 and/or one or more components of circuitry 110 are operating in a suspend mode of operation, storage 17 may signal one or more integrated circuits 15. This may result in one or more integrated circuits 15 signaling processor 12. This may result in processor 12 retrieving from BIOS ROM 31, and executing, instructions 56.

The execution of instructions 56 by processor 12 may result in processor 12 reading a copy (e.g., copy 62A) of the storage configuration data remaining in storage 17 after the change in the configuration of storage 17 has occurred. The execution of instructions 56 by processor 12 also may result in processor 12 signaling storage 17. This may result in storage 17 providing processor 12 with an indication of the change in the configuration of storage 17 that has occurred (e.g., which of the mass storage devices 28 have been removed). Alternatively or additionally, after the change in the configuration of storage 17 has occurred, storage 17 may supply one or more integrated circuits 15 with such an indication, and one or more integrated circuits 15 may provide such indication to processor 12. In this embodiment, as part of operation 206, processor 12 may generate, based at least in part upon such indication and the copy 62A read from storage 17, a modified version of the configuration data that may accurately reflect the resulting configuration of storage 17 as a result of the change made to the configuration of storage 17 by removal of one or more mass storage devices 28N. As a result of operation 206, processor 12 may store one or more copies of this modified version of the configuration data in storage 17, by, for example, overwriting one or more remaining copies of the configuration data presently in storage 17 with one or more copies of this modified version of the configuration data. For example, after execution of operation 206, configuration data 62A and 62B may comprise respective copies of this modified version of the configuration data, and metadata 64A and 64B may comprise respective copies of metadata, that may accurately reflect the resulting configuration of storage 17 that may result from the removal of one or more mass storage devices 28N from storage 17.

Alternatively or additionally, the execution by processor 12 of instructions 56 may result in processor 12 signaling system 16. This may result in a human user of system 100 being prompted to provide to processor 12, via system 16, an indication of the change in the configuration of storage 17 that has occurred, and/or of the resulting configuration of storage as a result of such change. Thereafter, processor 12 may utilize such indication in the manner described previously to carry out operation 206.

After execution of operation 206, a human user of system 100 may utilize system 16 to issue one or more commands and/or data to system 100. This may result in system 16 signaling one or more integrated circuits 15. This may result in processor 12 generating and issuing to one or more components of circuitry 110 one or more requests 72 that circuitry 110 and/or these one or more components operate in another mode of operation. In this embodiment, these one or more components may comprise, for example, system 16, one or more processes 23, 25, and/or 27, memory 21, and/or circuitry comprised in host processor 12 and/or chipset 14. In this embodiment, this another mode of operation may comprise, for example, a resume mode of operation.

For example, in response, at least in part, to one or more requests 72, the circuitry comprised in processor 12, chipset 14, memory 21, one or more integrated circuits 15, and/or user interface system 16 that had been de-activated and/or otherwise placed in a state, while last operating in sleep mode, in which such circuitry consumed no electrical power or consumed electrical power at a relatively reduced rate of consumption compared to when such circuitry is operating in a resume mode of operation, may be re-activated or placed in a state in which such circuitry may consume electrical power at a rate corresponding to operation in resume mode. This may result in circuitry 110 and/or these components of circuitry 110 enter resume mode, and consuming electrical power at a relatively higher rate than when such circuitry 110 and/or these components of circuitry 110 are operating in a sleep mode of operation.

Thereafter, or contemporaneously therewith at least in part, processor 12 may execute one or more processes 23 in accordance with the status information previously stored in memory 21 and/or storage 17. Thereafter, in response, at least in part, to one or more requests 72, current state and/or value of one or more variables, execution of program instructions, and/or data structures comprised in, utilized by, and/or operated upon by one or more processes 27 may be altered such that execution of one or more processes 27 by processor 12 may result in storing of other storage configuration data 50 in memory 21, as illustrated by operation 208 in FIG. 2. In this embodiment, this data 50 may be based, at least in part, upon at least one copy (e.g., copy 62A) of the storage configuration data stored in storage 17 as a result of operation 206, and data 50 may be indicative, at least in part, of the resulting configuration of storage 17 resulting from the change in configuration of storage 17. For example, while circuitry 110 and/or components of circuitry 110 were last previously operating in resume mode, data 50 may have reflected the configuration of storage 17 as represented by data 62A as data 62A may have been prior to execution of operation 206, and while circuitry 110 and/or these components of circuitry 110 were last previously operating in resume mode, one or more processes 23 may have been executed by processor 12 in accordance with such data 50. For example, while circuitry 110 and/or components of circuitry 110 were last previously operating in resume mode, the execution of one or more drivers 27 may have resulted in one or more operations involving storage 17 requested by I/O requests in queue 58 being executed in accordance with the configuration of storage 17 represented by such data 50. As part of operation 208, the execution of one or more drivers 27 by processor 12 may result in processor 12 modifying, as appropriate, data 50 to accurately reflect the configuration of storage 17 represented by storage configuration data 62A stored in storage 17 as a result of operation 206 (e.g., reflecting the resulting configuration of storage 17 resulting from removal of one or more mass storage devices 28N from storage 17).

Thereafter, the execution of one or more driver processes 27 by processor 12 may result in one or more operations involving storage 17 requested by one or more pending I/O requests in queue 58 being executed, based at least in part, upon data 50 stored in memory 21 as a result of operation 208. For example, if a request (e.g., request 60N) in queue 58 requests a reading of data stored in a volume (e.g., volume 66N) stored at least in part in one or more mass storage devices 28N removed from storage 17, the execution of one or more processes 27 by processor 12 may result in processor 12 signaling user interface system 16 to display an error message to a human user 16 indicating that the data requested to be read by request 60N is unavailable. Also for example, if request 60N requests that data be written into a volume (e.g., volume 66N) stored, at least in part, in one or more mass storage devices 28N removed from storage 17, the execution of one or more processes 27 by processor 12 may result in processor 12 writing the data into another volume (e.g., volume 66A) stored at least in part in one or more mass storage devices 28A. Many alternatives, variations, and modifications are possible without departing from this embodiment.

In this embodiment, operations 202, 204, and/or 208 may be executed while circuitry 110 may be operating in a resume mode of operation. However, many alternatives, modifications, and variations are possible without departing from this embodiment.

As stated previously, system 100 may comprise circuit card 20. If system 100 comprises circuit card 20, some or all of the circuitry comprised in one or more integrated circuits 15 may be comprised in operative circuitry 38 so as to permit operative circuitry 38 to be capable of being coupled to storage 17 via one or more media 40, and of exchanging data and/or commands with storage 17.

Thus, one system embodiment may comprise a circuit board comprising ROM to store instructions, and circuitry capable of executing the instructions. The execution of the instructions by the circuitry may result in, if a change in configuration of storage occurs during one mode of operation of a device, storing, in the storage, data indicative, at least in part, of resulting configuration of the storage resulting after the change, the device having a relatively lower power consumption rate while the device is operating in the one mode of operation compared to a relatively higher power consumption rate while the device is operating in another mode of operation.

In this system embodiment, if the configuration of the storage changes while the system and/or one or more components of the system are operating in a relatively low power consumption state, the changed configuration of the storage may be accurately reflected in the storage configuration data after the system and/or one or more components of the system enter a relatively high power consumption state. Advantageously, this may help prevent corruption of data stored in the storage.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   if a change in configuration of a Redundant Array of Inexpensive Disks (RAID) system occurs during a suspend mode of operation of a device coupled to the RAID system, storing, in the RAID system, data indicative, at least in part, of resulting configuration of the RAID system resulting after the change, the device having a relatively lower power consumption rate while the device is operating in the suspend mode of operation compared to a relatively higher power consumption rate while the device is operating in another mode of operation.

2. The method of claim 1, further comprising:
   in response, at least in part, to a request to operate in the another mode of operation, storing, at least in part, based at least in part upon the data, other data indicative at least in part of the resulting configuration of the RAID system; and
   executing, based at least in part upon the other data, one or more operations involving, at least in part, the RAID system.

3. The method of claim 1, wherein:
   the data comprises metadata.

4. The method of claim 1, further comprising:
   while the device is operating in the suspend mode of operation, preventing execution of one or more pending operations involving, at least in part, the RAID system.

5. The method of claim 1, wherein:
   the change in the configuration of the RAID system comprises at least one of a volume change and a RAID system change.

6. The method of claim 1, wherein:
   the another mode of operation comprises a resume mode of operation.

7. The method of claim 6, further comprising:
   in response, at least in part, to a request to operate in the suspend mode of operation, storing information indicating, at least in part, status of one or more processes being executed, at least in part, by the device.

8. The method of claim 1, wherein:
   the device comprises a host processor for executing a driver for accessing the data while the device is operating in the another mode of operation.

9. An apparatus comprising:
   circuitry for storing in a RAID system, if a change in configuration of the RAID system occurs during a suspend mode of operation of a device coupled to the RAID system, data indicative, at least in part, of resulting configuration of the RAID system resulting after the change, the device having a relatively lower power consumption rate while the device is operating in the suspend mode of operation compared to a relatively higher power consumption rate while the device is operating in another mode of operation.

10. The apparatus of claim 9, wherein:
    the circuitry is also for, in response, at least in part, to a request to operate in the another mode of operation, storing, at least in part, based at least in part upon the data, other data indicative at least in part of the resulting configuration of the RAID system; and
    the circuitry is also for executing, based at least in part upon the other data, one or more operations involving, at least in part, the RAID system.

11. The apparatus of claim 9, wherein:
    the data comprises metadata.

12. The apparatus of claim 9, wherein:
    the circuitry is also for, while the device is operating in the suspend mode of operation, preventing execution of one or more pending operations involving, at least in part, the RAID system.

13. The apparatus of claim 9, wherein:
    the change in the configuration of the RAID system comprises at least one of a volume change and a RAID system change.

14. The apparatus of claim 9, wherein:
    the another mode of operation comprises a resume mode of operation.

15. The apparatus of claim 14, wherein:
    the circuitry is also for, in response, at least in part, to a request to operate in the suspend mode of operation, storing information indicating, at least in part, status of one or more processes being executed, at least in part, by the device.

16. The apparatus of claim 9, wherein:
    the RAID system comprises a redundant array of inexpensive disks; and
    the device comprises a host processor for executing a driver for accessing the data while the device is operating in the another mode of operation.

17. An article comprising:
    a storage medium having stored therein instructions that when executed by a machine result in the following:
    if a change in configuration of a RAID system occurs during a suspend mode of operation of a device coupled to the RAID system, storing, in the RAID system, data indicative, at least in part, of resulting configuration of the RAID system resulting after the change, the device having a relatively lower power consumption rate while the device is operating in the suspend mode of operation compared to a relatively higher power consumption rate while the device is operating in another mode of operation.

18. The article of claim 17, wherein the instructions when executed also result in:

in response, at least in part, to a request to operate in the another mode of operation, storing, at least in part, based at least in part upon the data, other data indicative at least in part of the resulting configuration of the RAID system; and executing, based at least in part upon the other data, one or more operations involving, at least in part, the RAID system.

19. The article of claim 17, wherein:

the data comprises metadata.

20. The article of claim 17, wherein the instructions when executed also result in:

while the device is operating in the suspend mode of operation, preventing execution of one or more pending operations involving, at least in part, the RAID system.

21. The article of claim 17, wherein:

the change in the configuration of the RAID system comprises at least one of a volume change and a RAID system device change.

22. The article of claim 17, wherein:

the another mode of operation comprises a resume mode of operation.

23. The article of claim 22, wherein the instructions when executed also result in:

in response, at least in part, to a request to operate in the suspend mode of operation, storing information indicating, at least in part, status of one or more processes being executed, at least in part, by the device.

24. The article of claim 17, wherein:

the device comprises a host processor for executing a driver for accessing the data while the device is operating in the another mode of operation.

25. A system comprising:

a circuit board comprising read only memory (ROM) to store instructions; and circuitry for executing the instructions, execution of the instructions by the circuitry resulting in:

if a change in configuration of a RAID system occurs during a suspend mode of operation of a device coupled to the RAID system, storing, in the RAID system, data indicative, at least in part, of resulting configuration of the RAID system resulting after the change, the device having a relatively lower power consumption rate while the device is operating in the suspend mode of operation compared to a relatively higher power consumption rate while the device is operating in another mode of operation.

26. The system of claim 25, wherein:

the circuitry comprises a processor; and a circuit board also comprises one or more integrated circuits coupled to the processor and for being coupled to the storage.

27. The system of claim 26, wherein:

respective copies of the data are stored in respective storage devices comprised in the RAID system.

28. The system of claim 27, wherein:

the circuit board also comprises a bus and a circuit card slot coupled to the bus, the slot being coupled to the processor via a chipset.

29. The system of claim 25, wherein:

the instructions are comprised in basic input/output system (BIOS) instructions stored in the ROM.

* * * * *